United States Patent
Yun et al.

(10) Patent No.: US 9,635,197 B2
(45) Date of Patent: Apr. 25, 2017

(54) METHOD OF EXECUTING APPLICATION INSTALLED IN OUTSIDE SERVER AND IMAGE FORMING APPARATUS TO PERFORM THE SAME

(71) Applicant: Samsung Electronics Co., Ltd., Suwon-si, Gyeonggi-do (KR)

(72) Inventors: Jong-ha Yun, Yongin-si (KR); Steven F. Livengood, Laguna Niguel, CA (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/019,762

(22) Filed: Sep. 6, 2013

(65) Prior Publication Data

US 2014/0153040 A1 Jun. 5, 2014

Related U.S. Application Data

(60) Provisional application No. 61/731,572, filed on Nov. 30, 2012.

(30) Foreign Application Priority Data

Dec. 3, 2012 (KR) .................. 10-2012-0139262

(51) Int. Cl.
  *G06F 3/12* (2006.01)
  *H04N 1/00* (2006.01)
  *G06F 15/16* (2006.01)

(52) U.S. Cl.
  CPC ..... *H04N 1/00244* (2013.01); *H04N 1/00408* (2013.01)

(58) Field of Classification Search
  CPC ..... G06F 8/60; G06F 8/65; G06F 8/66; G06F 8/70; G06F 11/30; G06F 8/61;
  (Continued)

(56) References Cited

U.S. PATENT DOCUMENTS 6,947,949 B2   9/2005   Fujisawa
8,654,383 B2   2/2014   Sugimoto
(Continued)

FOREIGN PATENT DOCUMENTS

CN   101911089 A   12/2010
CN   102196141 A    9/2011
(Continued)

OTHER PUBLICATIONS

UPnP(tm) Device Architecture 1.1. Document Revision Date: Oct. 15, 2008.*
(Continued)

*Primary Examiner* — Chad Dickerson
(74) *Attorney, Agent, or Firm* — Staas & Halsey LLP

(57) ABSTRACT

A method of executing an application installed in an outside server at an image forming apparatus includes receiving, at the image forming apparatus, an input of an install uniform resource locator (URL), accessing, by the image forming apparatus, the outside server through the install URL and receiving from the outside server metadata of the application installed in the outside server, verifying a reliability of the received metadata, creating an icon corresponding to the application on a user interface of the image forming apparatus when the reliability is verified, and executing the application installed in the outside server at the image forming apparatus.

21 Claims, 6 Drawing Sheets

(58) Field of Classification Search
CPC . G06F 9/4411; G06F 9/4413; H04N 1/00002;
H04N 1/00015; H04L 29/08648; H04L
29/08675; H04L 67/10; H04L 61/2587;
H04L 12/2803; H04L 67/16; H04L
67/025; H04L 61/30; H04L 69/329; H04L
12/2818; H04L 29/08099
USPC ............... 358/1.11–1.18, 1.1, 400–404;
709/201–207, 212–219; 717/168–178;
399/81
See application file for complete search history.

(56) References Cited

U.S. PATENT DOCUMENTS

| | | | |
|---|---|---|---|
| 8,868,904 B2 | 10/2014 | Ueda et al. | |
| 9,325,864 B2* | 4/2016 | Ito | ............... H04N 1/00222 |
| 2002/0129129 A1* | 9/2002 | Bloch | ............... G06F 8/61 |
| | | | 709/220 |
| 2005/0138065 A1* | 6/2005 | Ciriza | ............... G06Q 10/10 |
| 2005/0267935 A1* | 12/2005 | Gandhi | ............... H04L 29/1232 |
| | | | 709/203 |
| 2005/0268090 A1* | 12/2005 | Saw | ............... G06F 21/608 |
| | | | 713/156 |
| 2007/0247664 A1* | 10/2007 | Yamamoto | ............ G06F 3/1203 |
| | | | 358/1.16 |
| 2008/0091800 A1 | 4/2008 | Sorrentino et al. | |
| 2009/0089802 A1 | 4/2009 | Wang et al. | |
| 2010/0107152 A1* | 4/2010 | Kwon | ............... G06F 8/60 |
| | | | 717/174 |
| 2010/0107153 A1* | 4/2010 | Kwon | ............... G06F 8/61 |
| | | | 717/175 |
| 2010/0169413 A1 | 7/2010 | Kim et al. | |
| 2011/0134456 A1* | 6/2011 | Tsujimoto | ........... H04N 1/00204 |
| | | | 358/1.13 |
| 2011/0228328 A1* | 9/2011 | Sugimoto | ............... G06F 9/542 |
| | | | 358/1.15 |
| 2011/0252117 A1* | 10/2011 | Sng | ............... H04L 63/029 |
| | | | 709/219 |
| 2013/0013665 A1* | 1/2013 | Sng | ............... G06F 21/53 |
| | | | 709/203 |

FOREIGN PATENT DOCUMENTS

| | | |
|---|---|---|
| EP | 2315121 | 4/2011 |
| EP | 2367109 | 9/2011 |
| KR | 10-2011-0034083 | 4/2011 |
| KR | 10-2012-0078069 | 7/2012 |

OTHER PUBLICATIONS

UPnP(TM) Device Architecture 1.1. Document Revision Date:Oct. 15, 2008.*
EP Communication issued in corresponding Application No. 13189890.0 on Apr. 11, 2014.
International Search Report and Written Opinion issued in corresponding Application No. PCT/KR2013/008582 on Jan. 20, 2014.
European Search Report issued in corresponding Application No. 13189890.0 on Mar. 31, 2014.
Chu Y-H et al: "Referee:Trust Management for Web Applications" vol. 29, No. 8-13, Sep. 1, 1997, pp. 953-964, XP004095294.
Brian Bissett: "Expanding the MFP Ecosystem With Xerox's Extensible Interface Platform (EIP)", Jun. 30, 2008, pp. 1-18, XP055003175.
Chinese Office Action issued Feb. 20, 2017 in corresponding Chinese Patent Application No. 201380071947.5.

* cited by examiner

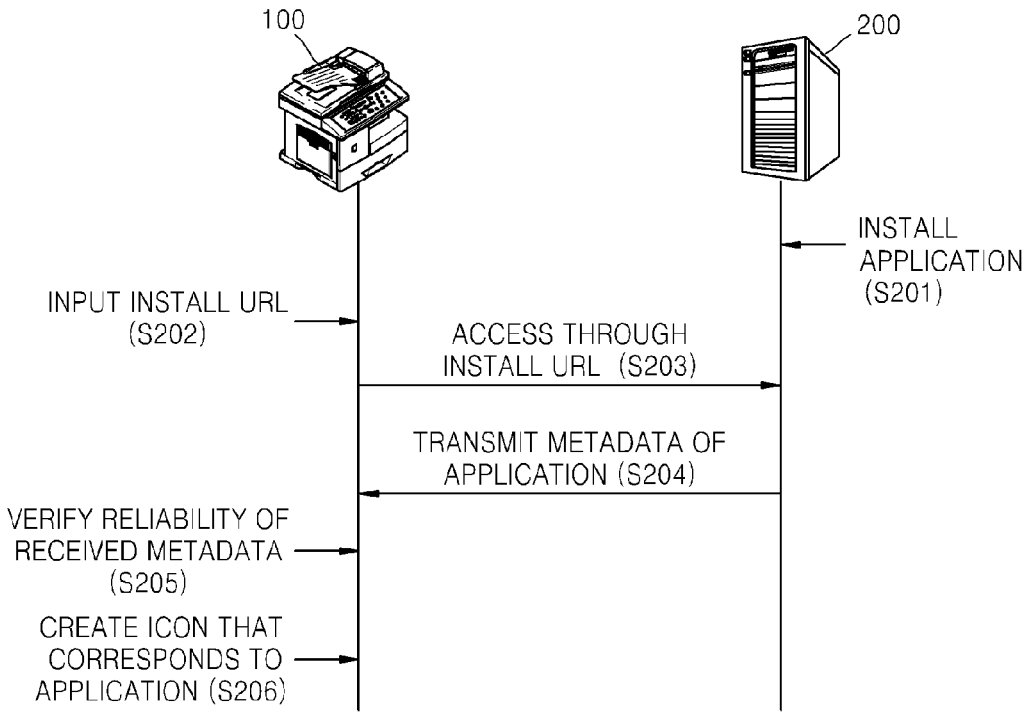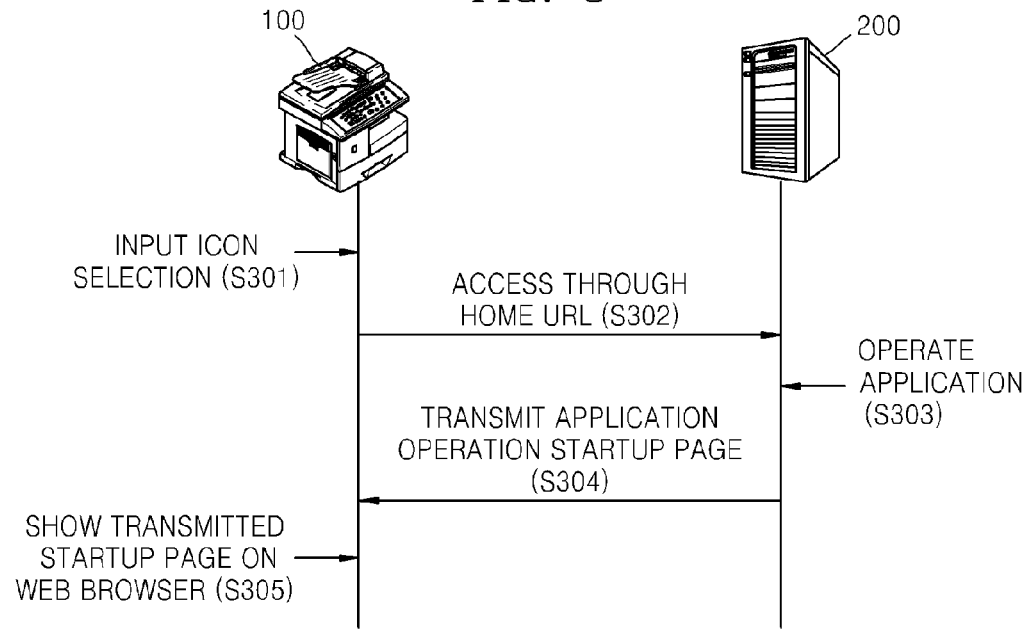

METHOD OF EXECUTING APPLICATION INSTALLED IN OUTSIDE SERVER AND IMAGE FORMING APPARATUS TO PERFORM THE SAME

CROSS-REFERENCE TO RELATED APPLICATIONS

This application claims priority under 35 U.S.C. §§119 and 120 from Korean Patent Application No. 10-2012-0139262, filed on Dec. 3, 2012, in the Korean Intellectual Property Office, and U.S. patent application Ser. No. 61/731,572, filed on Nov. 30, 2012, in the U.S. Patent and Trademark Office, the disclosures of which are incorporated herein in their entirety by reference.

BACKGROUND OF THE INVENTION

1. Field of the Invention

The present general inventive concept relates to a method of executing in an image forming apparatus an application installed in an outside server.

2. Description of the Related Art

There are two major ways of supporting an open platform in a multifunction printer (MFP). The first way is a method of installing a whole application in the MFP. The second way is a method of installing the application in a separate outside server and showing only a user interface (UI) of the application on the MFP instead. According to this second way, when a user controls the application through the UI shown on the MFP, the MFP communicates with the outside server where the application has been installed, and operates the application.

In the second way, usually the MFP shows the UI of the application to the user through a web browser, and the application installed in the outside server gives a command to the MFP by calling from the outside an open application programming interface (API) of the MFP. In this method, the MFP has to be able to recognize the application installed in the outside server. Conventionally, the user had to input metadata of the application directly into the MFP, which caused inconvenience. Moreover, if there was a firewall between the MFP and the outside server, in order for the application installed in the outside server to give a command to the MFP, the MFP had to support a JavaScript API.

SUMMARY OF THE INVENTION

The present general inventive concept provides a method of recognizing in an image forming apparatus an application that is installed in an outside server, and executing the application in the image forming apparatus.

Additional features and utilities of the present general inventive concept will be set forth in part in the description which follows and, in part, will be obvious from the description, or may be learned by practice of the general inventive concept.

Exemplary embodiments of the present general inventive concept provide a method of using in an image forming apparatus an application installed in an outside server, the method including receiving, at the image forming apparatus, an input of an install uniform resource locator (URL), accessing, by the image forming apparatus, the outside server through the install URL and receiving from the outside server metadata of the application installed in the outside server, verifying a reliability of the received metadata, creating an icon corresponding to the application on a user interface of the image forming apparatus when the reliability is verified, and executing in the image forming apparatus the application installed in the outside server.

The reliability of the metadata may be verified by using a signature included in the metadata, a certificate of the outside server, and a public key stored in the image forming apparatus, to thus decide whether or not the application was produced by a qualified producer.

The signature used to verify the reliability may be included only in the metadata.

Here, when executing the application, the metadata may include a home URL through which the image forming apparatus accesses the outside server. The using of the application may include selecting the created icon, accessing, by the image forming apparatus, the outside server through the home URL, receiving, at the image forming apparatus, an application operation startup page from the outside server, and displaying the received startup page on the user interface of the image forming apparatus.

The home URL may be in a form including the install URL.

The metadata may include a reverse URL through which the image forming apparatus transmits an operation command request to the outside server. The executing of the application may include transmitting, from the image forming apparatus, an operation command request to the outside server through the reverse URL, receiving, at the image forming apparatus, the operation command transmitted from the outside server in response to the operation command request, and performing an operation according to the received operation command.

The reverse URL may be in a form including the install URL.

The metadata may comprise an event URL through which the image forming apparatus transmits to the outside server an event that occurs in the image forming apparatus. The executing of the application may include recognizing the event that occurs in the image forming apparatus, and transmitting the recognized event to the outside server through the event URL.

The event URL may be in a form including the install URL.

The creating of the icon may include creating on the user interface the icon that is included in the metadata.

A non-transitory computer-readable recording medium may contain computer-readable codes as a program to execute the method.

Exemplary embodiments of the present general inventive concept also provide an image forming apparatus including a communication interface to communicate with an outside server where an application is installed, a user interface to receive a user input, a controlling unit to enable the image forming apparatus to perform an image forming operation by using the application installed in the outside server, and an image forming operation execution unit to execute the image forming operation under the control of the controlling unit, wherein the controlling unit includes an application installation manager, wherein, once the image forming apparatus accesses the outside server through an install uniform resource locator (URL) received at the user interface, the application installation manager receives application metadata from the outside server, verifies a reliability of the received metadata, and after completing the reliability verification, and creates on the user interface an icon corresponding to the application.

The application installation manager may verify the reliability of the metadata by using a signature included in the metadata, a certificate of the outside server, and a public key stored in the image forming apparatus, to thus decide whether or not the application was produced by a qualified application producer.

The signature used to verify reliability of the metadata may be included only in the metadata.

Here, when executing the application, the metadata may include a home URL through which the image forming apparatus accesses the outside server. The controlling unit may receive the icon selection input from the user interface, control the image forming apparatus to access the outside server through the home URL, receives an operation startup page of the application from the outside server, and controls the user interface unit to display the received startup page.

The home URL may be in the form including the install URL.

The metadata may include a reverse URL through which the image forming apparatus transmits an operation command request to the outside server. The controlling unit may further include an operation command manager. The operation command manager may enable the image forming apparatus to transmit an operation command request to the outside server through the reverse URL, receive the operation command transmitted from the outside server in response to the operation command request, and control the image forming operation execution unit that performs the image forming operation to execute an image forming operation following the received operation command.

The reverse URL may be in a form including the install URL.

The metadata may include an event URL through which the image forming apparatus transmits to the outside server an event that occurs in the image forming apparatus. The controlling unit may further include an event manager. The event manager may recognize the event that occurred in the image forming apparatus, and transmit the recognized event to the outside server through the event URL.

The event URL may be in a form including the install URL.

Exemplary embodiments of the present general inventive concept also provide a method of executing in an image forming apparatus an application installed in an outside server, the method including inputting into the image forming apparatus an install uniform resource locator (URL) corresponding to the outside server, controlling the image forming apparatus to access the outside server via the install URL, and to receive from the outside server metadata of the application, creating at the image forming apparatus a user interface corresponding to the application, and executing the application in the image forming apparatus via the user interface.

The method may further include controlling the image forming apparatus to request data from the outside server, and receiving data from the outside server in response to the request.

Prior to controlling the image forming apparatus to access the outside server via the install URL, the metadata of the application may be only stored in the outside server.

Exemplary embodiments of the present general inventive concept also provide an image forming apparatus including a user interface unit to receive a user input of an install uniform resource locator (URL) corresponding to an outside server where an application is installed, a communication interface unit to access the outside server through the install URL and receive from the outside server metadata of the application, and a control unit to create a user interface corresponding to the application at the user interface unit, and to execute the application in the image forming apparatus via the user interface.

Exemplary embodiments of the present general inventive concept also provide an image forming apparatus including a user interface unit to communicate with an outside server, and a control unit to store a URL, to access the outside server using the stored URL to receive data from the outside server, to create an icon in a user interface according to the received data, and to perform an image forming operation through the icon.

BRIEF DESCRIPTION OF THE DRAWINGS

These and/or other features and utilities of the present general inventive concept will become apparent and more readily appreciated from the following description of the embodiments, taken in conjunction with the accompanying drawings of which:

FIG. 2 illustrates a process of recognizing an application in an image forming apparatus, according to a method of executing an application according to an exemplary embodiment of the present general inventive concept;

FIG. 3 illustrates an early process of application operation, according to a method of executing an application according to an exemplary embodiment of the present general inventive concept;

DETAILED DESCRIPTION OF THE EMBODIMENTS

Figure 1:
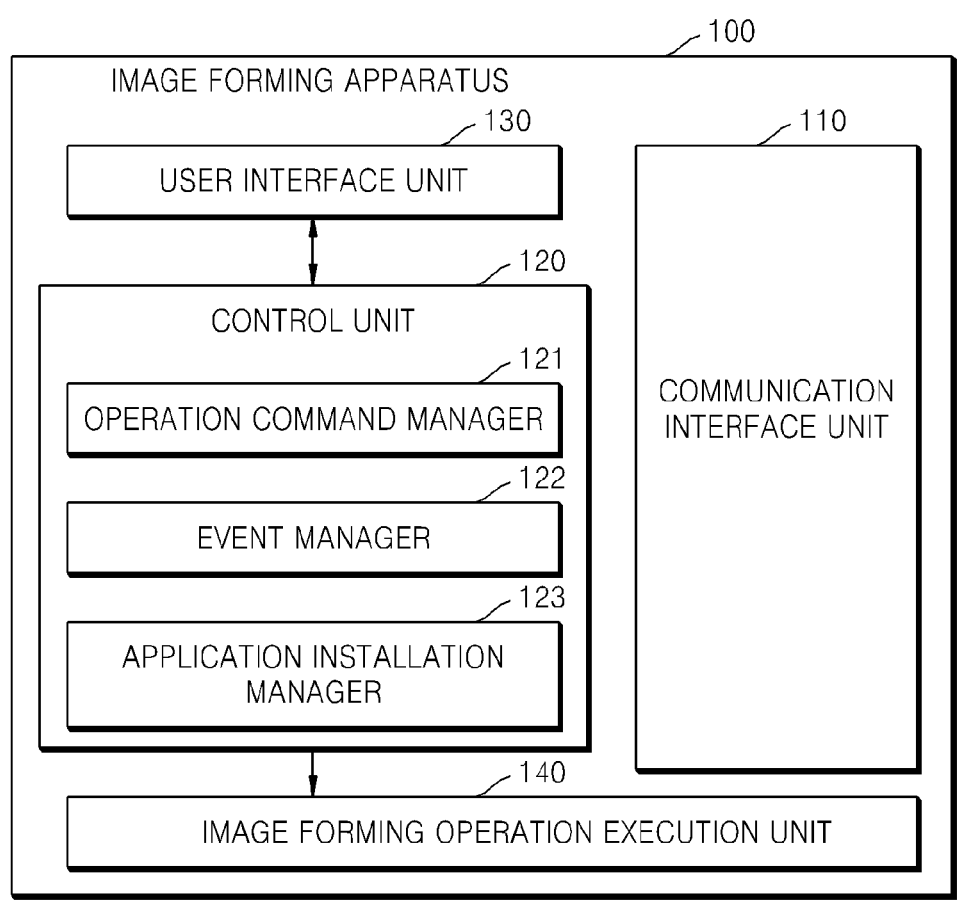
FIG. 1 illustrates a composition of an image forming apparatus according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures. In order to provide a clearer description of the exemplary embodiments, what is already generally known among those skilled in the art will be omitted.

FIG. 1 is a block diagram illustrating an image forming apparatus 100 according to an exemplary embodiment of the present general inventive concept. Referring to FIG. 1, according to an exemplary embodiment of the present general inventive concept, an image forming apparatus 100 may include a communication interface unit 110, a control unit 120, a user interface unit 130, and an image forming operation execution unit 140. The control unit 120 may include an operation command manager 121, an event manager 122, and an application installation manager 123.

The communication interface unit 110 enables the image forming apparatus 100 to communicate with an outside server 200 (illustrated in FIGS. 2-5). The image forming apparatus 100 may communicate with the outside server 200 and recognize an application that is installed in the outside server 200. Since the image forming apparatus 100 transmits/receives information to and from the outside server 200, respectively, by communicating with the outside server 200, a user may operate and use the application installed in the outside server 200 through the user interface unit 130 of the image forming apparatus 100. Here, the application installed in the outside server 200 is what is used to execute an image forming operation. For instance, there is a 'scan to e-mail' operation that sends a scanned document via e-mail.

The control unit 120 performs a series of controlling operations that enable the image forming apparatus 100 to recognize the application installed in the outside server 200, and the user to use the application installed in the outside server 200 through the user interface unit 130. The control unit 120 includes the operation command manager 121, the event manager 122, and the application installation manager 123, which play a role of transmitting an operation command request and receiving an operation command, recognizing and transmitting an event, recognizing the application, etc., respectively. A detailed description of each operation will be provided in the following descriptions referring to FIGS. 2 to 5 below.

The user interface unit 130 may receive a user input. The user interface unit 130 may be, for example, a web browser displayed on the user interface 130 (for example, a display unit) of the image forming apparatus 100. The image forming operation execution unit 140 may execute the image forming operation under the control of the control unit 120.

The following description is a method of executing, at the image forming apparatus 100, the application installed in the outside server 200, according to an exemplary embodiment of the present general inventive concept, with reference to FIGS. 1 to 5.

FIG. 2 illustrates a process of recognizing the application at the image forming apparatus 100, according to a method of executing the application according to an exemplary embodiment of the present general inventive concept. Referring to FIG. 2, in operation S201, an application is installed in an outside server 200. The user may purchase the application from an application developing company and install the application in a user web application server (not illustrated). In order for the image forming apparatus 100 to recognize the application installed in the outside server 200, the image forming apparatus 100 receives an input of an install uniform resource locator (URL) from the user, through the user interface 130, in operation S202. Here, the install URL may be an IP address of the outside server 200.

Once having received the install URL, the application installation manager 123 of the image forming apparatus 100 accesses the outside server 200 through the given install URL in operation S203, and receives metadata of the application from the outside server 200 in operation S204.

Here, the metadata of the application means data that is needed to recognize the application. The metadata includes an application identity, an icon, a home URL, environment setting information, etc. The application identity means information such as the application's name and version. The icon means an icon that is displayed on the user interface 130 of the image forming apparatus 100, and that is used to execute the application. The home URL means a network address that is needed in order to access a startup page shown on the user interface 130 of the image forming apparatus 100 when starting the application. The environment setting information means setting information to execute the application in the image forming apparatus 100.

Conventionally, when an image forming apparatus recognizes an application installed in an outsider server, a user had to directly input metadata of the application to the image forming apparatus. Then, the image forming apparatus recognized the application installed in the outside server based on the metadata that had been input by the user, and created an icon on a user interface such as a display unit of the image forming apparatus, the icon having been included in the metadata as an icon corresponding to the application. This conventional method of directly inputting the metadata in the image forming apparatus by the user took a long time if there were multiple image forming apparatuses that were going to use the application, and was also inconvenient because the user had to input the metadata every time when there was a change in the application.

However, according to an exemplary embodiment of the present general inventive concept, the only thing the user has to do is input the install URL to the user interface unit 130 of the image forming apparatus 100. By doing this, the image forming apparatus 100 receives the application's metadata from the outside server 200 and easily recognizes the application.

Meanwhile, according to an exemplary embodiment of the present general inventive concept, the metadata of the application may further include a reverse URL and an event URL in addition to the application identity, the icon, the home URL, and the environment setting information mentioned above. The reverse URL is a network address to transmit an operation command request from the image forming apparatus 100 to the application installed in the outside server 200. Also, the event URL is a network address to transmit to the outside server 200 an event when the event occurs and was recognized in the image forming apparatus 100. More detailed description about the reverse URL and the event URL will be further provided with reference to FIGS. 4 and 5 below.

Referring back to FIG. 2, after receiving the metadata from the outside server 200, the application installation manager 123 of the image forming apparatus 100 verifies reliability of the received metadata in operation S205. The image forming apparatus 100 may verify reliability of the metadata by using a signature included in the metadata, a certificate of the outside server 200, and a public key included in the image forming apparatus 100.

For the purposes of this exemplary embodiment of the general inventive concept, verifying the reliability of the metadata means confirming that the application installed in the outside server 200 was produced by a qualified application developing company. If the signature is included in the whole application, the whole application has to be downloaded and be verified of reliability by the image forming apparatus 100. In this case, a security problem may occur due to a source code exposure and a network traffic problem may also occur if the application's volume is heavy. Therefore, according to an exemplary embodiment of the present general inventive concept, the signature is made to be included only in the metadata, not in the whole application, thus solving the problem above.

After verifying the reliability of the metadata, in operation S206, the application installation manager 123 of the image forming apparatus 100 creates on the user interface unit 130 of the image forming apparatus 100, such as on a web browser, an icon that corresponds to the application installed in the outside server 200. In this case, the created icon may be an icon that was included in the received metadata of operation S204. The user selects the icon on the user interface unit 130 in order to execute the application installed in the outside server 200, and may control the application through the user interface unit 130.

FIG. 3 illustrates an early process of application operation, according to a method of executing the application according to an exemplary embodiment of the present general inventive concept. Referring to FIG. 3, once an icon is selected and input from the user is received on the user interface unit 130 in operation S301, the image forming apparatus 100 accesses the outside server 200 through the home URL included in the metadata in operation S302. Next, the application installed in the outside server 200 is operated in operation S303, and the outside server 200 transmits the operation startup page of the application to the image forming apparatus 100 in operation S304. The control unit 120 of the image forming apparatus 100 shows on the user interface unit 130 the received startup page, so that the user can see the startup page in operation S305. The user may control the application through the startup page shown on the user interface unit 130.

Meanwhile, the home URL may be in a form that includes the install URL. For instance, if the install URL, which is an IP address of the outside server 200, is "211.244.110.000", the home URL may be "211.244.110.000/Home". As such, since the home URL is in a form that includes the install URL, even if the install URL, the IP address of the outside server 200, changes, the home URL may alter accordingly and automatically.

Figure 4:
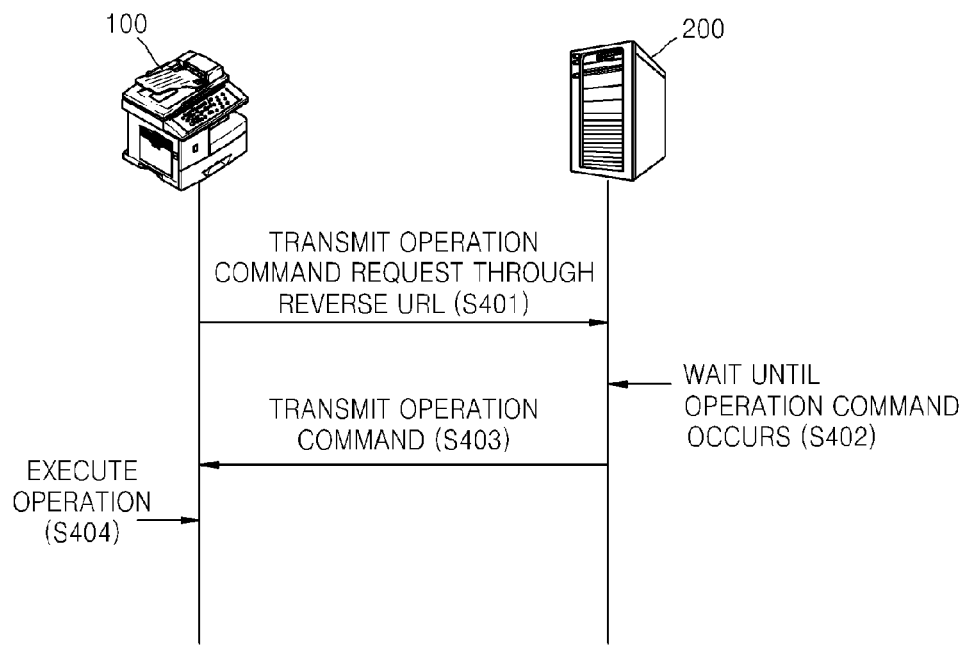
FIG. 4 illustrates a process of transmitting an operation command according to a method of executing an application according to an exemplary embodiment of the present general inventive concept.

FIG. 4 illustrates a process of transmitting an operation command, according to a method of executing the application according to an exemplary embodiment of the present general inventive concept. Referring to FIG. 4, the operation command manager 121 of the image forming apparatus 100 transmits an operation command request to the outside server 200 through the reverse URL included in the metadata in operation S401. When the outside server 200 receives the operation command request, the outside server 200 waits, and does not transmit a response for the operation command request, until an operation command occurs in operation S402. When the operation command occurs in the application installed in the outside server 200, the outside server 200 transmits the operation command to the image forming apparatus 100, in operation S403. After receiving the operation command from the outside server 200, the operation command manager 121 of the image forming apparatus 100 controls the image forming operation execution unit 140 to execute the operation in operation S404.

The reason why the image forming apparatus 100 transmits the operation command request to the outside server 200 through the reverse URL and receives the operation command in response to the request is as follows.

If the image forming apparatus 100 is connected to a local network (not illustrated) such as an intranet while the application is installed in the outside server 200 that is connected to an external network (not illustrated) such as a cloud, and a firewall (not illustrated) may exist between the image forming apparatus 100 and the outside server 200. In this situation, the firewall will block the command, if the command is directly given from the application installed in the outside server 200 to the image forming apparatus 100. Therefore, in order to avoid the blocking problem, the image forming apparatus 100 must provide a JavaScript application programming interface (API), which makes the application developing company take the burden of having to learn not only a hypertext transfer protocol (HTTP) based API but also the JavaScript API.

In order to solve the problem above, according to an exemplary embodiment of the present general inventive concept, the image forming apparatus 100 first accesses the outside server 200 and transmits the operation command request through the reverse URL. Even if there is a firewall, the outside server 200 can transmit the response to the request after receiving the request from the image forming apparatus 100. Therefore, when the outside server 200 receives the operation command request, the outside server 200 does not immediately transmit a response, but waits until the operation command occurs. When the operation command occurs, then the outside server 200 transmits the operation command to the image forming apparatus 100.

Meanwhile, the reverse URL may be in a form that includes the install URL. For instance, if the install URL, which is an IP address of the outside server 200, is "211.244.110.000", the reverse URL may be "211.244.110.000/reverse". As such, since the reverse URL is in a form that includes the install URL, even if the install URL, the IP address of the outside server 200, changes, the reverse URL may alter accordingly and automatically.

Figure 5:
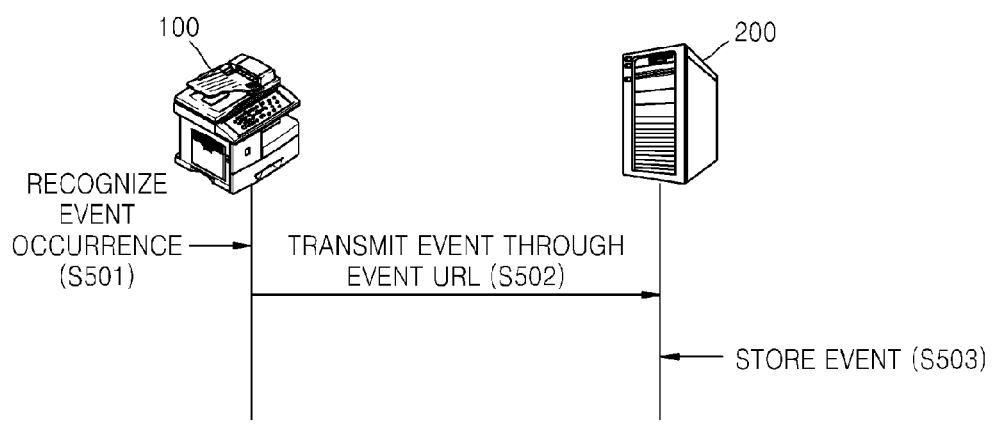
FIG. 5 illustrates a process of transmitting an event that has occurred in an image forming apparatus, according to a method of executing an application according to an exemplary embodiment of the present general inventive concept.

FIG. 5 illustrates a process of transmitting an event that has occurred in the image forming apparatus 100, according to a method of executing an application according to an exemplary embodiment of the present general inventive concept. Referring to FIG. 5, when the event occurs in the image forming apparatus 100, the event manager 122 recognizes the event in operation S501. Then, in operation S502, the event manager 122 transmits the recognized event to the outside server 200 through the event URL that is included in the metadata. The outside server 200 receives the event from the image forming apparatus 100, and stores the event in a storage unit in the outside server 200 in operation S503.

If there is not a firewall between the image forming apparatus 100 and the outside server 200, the outside server 200 may directly access the image forming apparatus 100 and monitor the event that occurs in the image forming apparatus 100. Yet it is impossible to do so if there is a firewall. However, as shown in the above exemplary embodiment of the present general inventive concept, if the image forming apparatus 100 recognizes the event occurrence and transmits the recognized event to the outside server 200, the operation is possible regardless of whether there is a firewall or not.

Meanwhile, the event URL may be in a form that includes the install URL. For instance, if the install URL, which is an IP address of the outside server 200, is "211.244.110.000", the event URL may be "211.244.110.000/Event". As such, since the event URL is in a form that includes the install URL, even if the install URL, the IP address of the outside server 200, changes, the event URL may alter accordingly and automatically.

FIGS. 6 to 9 are flowchart views illustrating a method of executing in an image forming apparatus 100 the application installed in the outside server 200, according to an exemplary embodiment of the present general inventive concept. For the purposes of the exemplary embodiment of the present general inventive concept illustrated in FIGS. 6-9, the image forming apparatus 100 may be a multifunction printer (MFP), performing multiple image forming operations such as printing and scanning.

Figure 6:
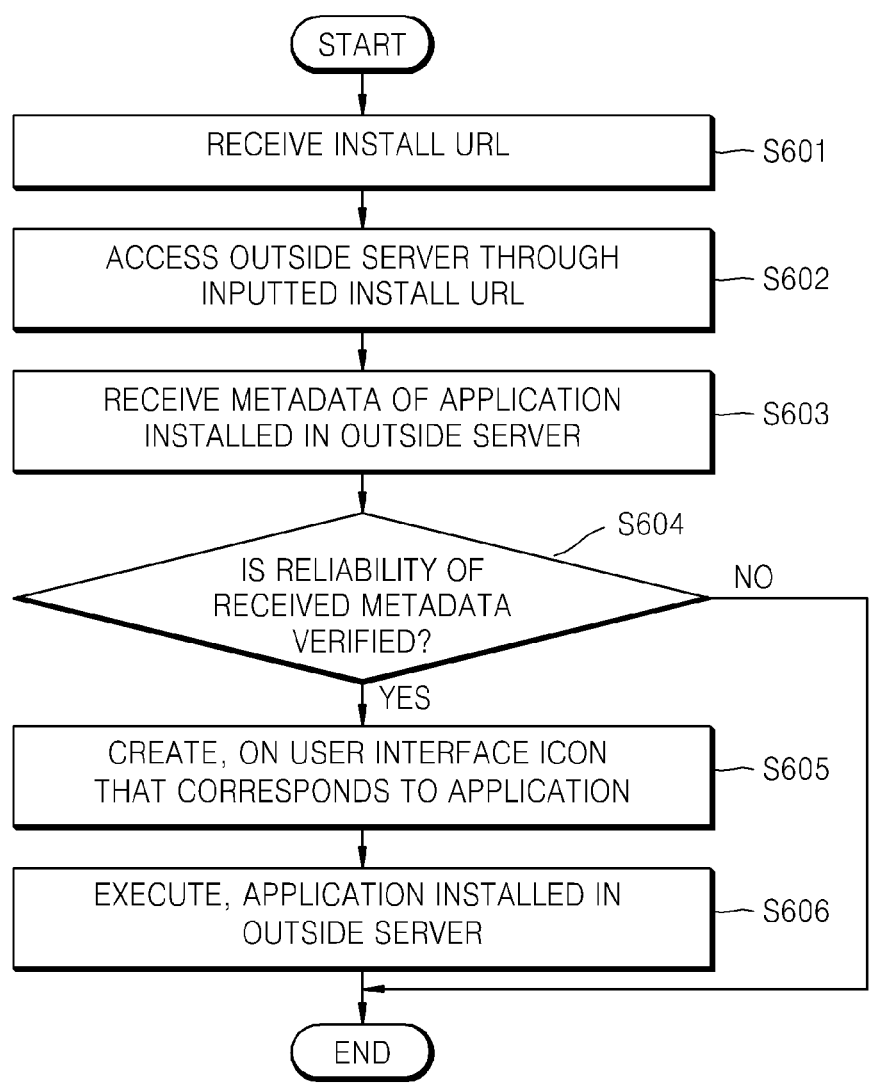
FIGS. 6 to 9 are flowchart views illustrating a method of executing in the image forming apparatus an application installed in an outside server, according to an exemplary embodiment of the present general inventive concept.

Referring to FIG. 6, when the image forming apparatus 100 receives the input of the install URL from the user on the web browser in operation S601, the image forming apparatus 100 accesses the outside server 200 through the received install URL in operation S602. Next, the image forming apparatus 100 receives from the outside server 200 the metadata of the application installed in the outside server 200 in operation S603. In order to check if the application installed in the outside server 200 was produced by a qualified application developing company, in operation S604, the image forming apparatus 100 verifies reliability of the metadata by using the signature included in the metadata, the certificate of the outside server 200, and the public key stored in the all-in-one printer. In this exemplary embodiment of the present general inventive concept, the signature that is used in reliability verification is to be included only in the metadata, thus making the reliability verification possible by receiving only the metadata from the outside server 200.

If the reliability of the metadata is not verified (operation S604—No), the process ends without executing the application.

If the reliability of the metadata is verified (operation S604—Yes), the icon that corresponds to the application installed in the outside server 200 is created on the user interface unit 130 of the image forming apparatus 100 in operation S605. After the application is recognized in the image forming apparatus 100 and the corresponding icon is completely created, the user now may execute in the image forming apparatus 100 the application installed in the outside server 200 in operation S606.

Figure 7:
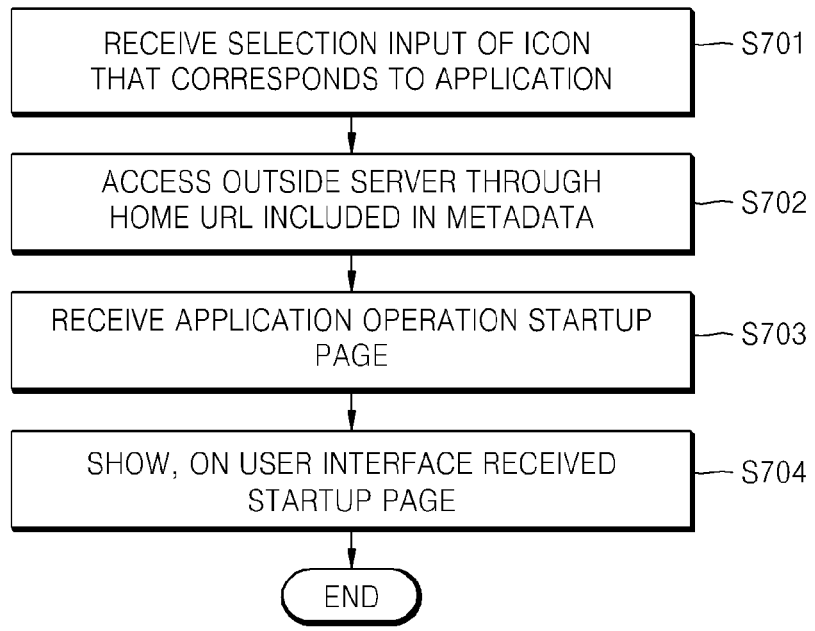

FIG. 7 is a flowchart illustrating specific operations included in operation S606 of FIG. 6, illustrating an initial operation process of the application. Referring to FIG. 7, in operation S701 the image forming apparatus 100 receives the user selection input of the icon created on the user interface unit 130 of the image forming apparatus 100. Once the icon selection input is received in operation S702, the image forming apparatus 100 accesses the outside server 200 through the home URL included in the metadata that was received in operation S603 of FIG. 6. In response, the application is operated in the outside server 200, and the outside server 200 transmits the application operation startup page to the image forming apparatus 100. The image forming apparatus 100 receives the operation startup page in operation S703. Lastly, in operation S704 the image forming apparatus 100 shows the startup page received from the outside server 200 on the user interface unit 130 of the image forming apparatus 100, such as on a web browser.

Meanwhile, the home URL may be in a form that includes the install URL. For instance, if the install URL, which is an IP address of the outside server 200, is "211.244.110.000", the home URL may be "211.244.110.000/Home". As such, since the home URL is in a form that includes the install URL, even if the install URL, the IP address of the outside server 200, changes, the home URL may alter accordingly and automatically.

Figure 8:
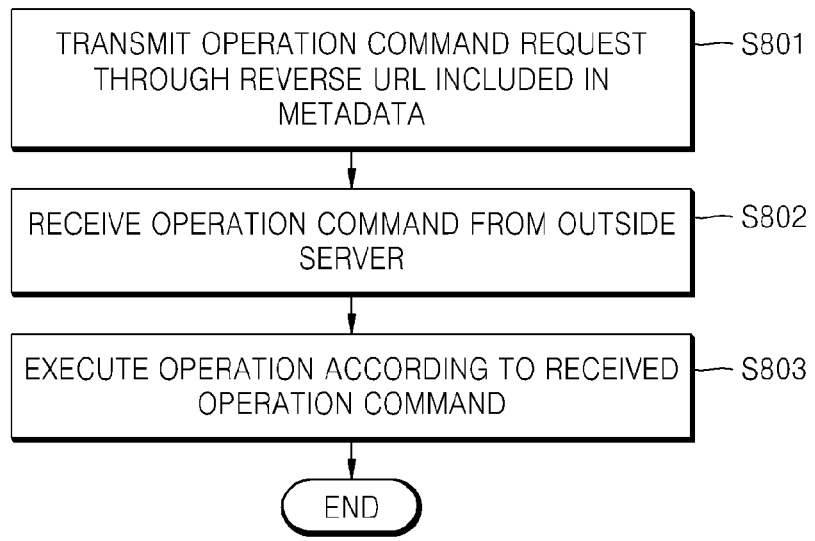

FIG. 8 is a flowchart illustrating specific operations included in operation S606 of FIG. 6, illustrating a process of transmitting the operation command. Referring to FIG. 8, in operation S801, the image forming apparatus 100 transmits the operation command request to the outside server 200 through the reverse URL included in the metadata that was received in operation S603 of FIG. 6. When the outside server 200 receives the operation command transmission request from the image forming apparatus 100 through the reverse URL, the outside server 200 does not respond immediately, but waits until the operation command occurs in the application. When the operation command occurs, the outside server 200 transmits the operation command to the image forming apparatus 100 in response to the received operation command transmission request. The operation command is then received by the image forming apparatus 100 in operation S802. When the image forming apparatus 100 receives the operation command, the image forming apparatus 100 executes the operation according to the operation command in operation S803.

As such, the image forming apparatus 100 first transmits the operation command request to the outside server 200 through the reverse URL. Then the outside server 200 receives the operation command request and waits until the operation command occurs. When the operation command occurs, the outside server 200 transmits the operation command to the image forming apparatus 100 in response to the received operation command request. This way, it is possible to transmit the operation command even if there is a firewall between the image forming apparatus 100 and the outside server 200.

Meanwhile, the reverse URL may be in a form that includes the install URL. For instance, if the install URL, which is an IP address of the outside server 200, is "211.244.110.000", the reverse URL may be "211.244.110.000/Reverse". As such, since the reverse URL is in a form that includes the install URL, even if the install URL, the IP address of the outside server 200, changes, the reverse URL may alter accordingly and automatically.

Figure 9:
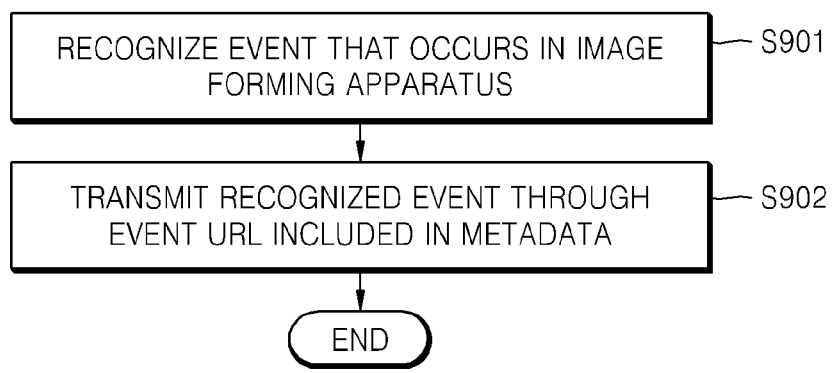

FIG. 9 is a flowchart illustrating specific steps included in operation S606 of FIG. 6, illustrating a process of transmitting the event that occurs in the image forming apparatus 100. Referring to FIG. 9, in operation S901, the image forming apparatus 100 recognizes the event that occurs in the image forming apparatus 100. After the event is recognized, in operation S902, the image forming apparatus 100 transmits the recognized event to the outside server 200 through the event URL included in the metadata that was received in operation S603 of FIG. 6. The outside server 200 may monitor the events that occur in the image forming apparatus 100, by storing the event transmitted from the image forming apparatus 100.

If there is not a firewall between the image forming apparatus 100 and the outside server 200, the outside server 200 may directly access the image forming apparatus 100 and monitor the events that occur in the image forming apparatus 100. Yet it is impossible to do so if there is the firewall. However, as shown in the above exemplary embodiment of the present general inventive concept, if the image forming apparatus 100 recognizes the event occurrence and transmits the occurred event to the outside server 200, the operation is possible no matter where there is the firewall or not.

Meanwhile, the event URL may be in a form that includes the install URL. For instance, if the install URL, which is an IP address of the outside server 200, is "211.244.110.000", the event URL may be "211.244.110.000/Event". As such, since the home URL is in a form that includes the install URL, even if the install URL, the IP address of the outside server 200, changes, the event URL may alter accordingly and automatically.

According to the exemplary embodiment above, the image forming apparatus 100 has the merit of enabling the image forming apparatus 100 to recognize the application installed in the outside server 200 simply by inputting the install URL.

In addition, in a process of recognizing the application, the image forming apparatus 100 quickly and easily verifies the application's reliability by receiving the metadata of the application and using the signature included in the metadata and the certificate of the outside server 200.

Furthermore, even if there is the firewall between the image forming apparatus 100 and the outside server 200, the image forming apparatus 100 is able to remotely control the application by transmitting to the outside server 200 the operation command request and the occurred event, respectively through the reverse URL and event URL that are included in the application's metadata received from the outside server 200.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include a semiconductor memory, a read-only memory (ROM), a random-access memory (RAM), a USB memory, a memory card, a Blu-Ray disc, CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

According to the description above, the image forming apparatus has the merit of enabling the image forming apparatus to recognize the application installed in the outside server simply by inputting the install URL.

In addition, in a process of recognizing the application, the image forming apparatus quickly and easily verifies the application's credibility by receiving the metadata of the application and using the signature included in the metadata and the certificate of the outside server.

Furthermore, even if there is the firewall between the image forming apparatus and the outside server, the image forming apparatus is able to remotely control the application by transmitting to the outside server the operation command request and the occurred event, respectively through the reverse URL and event URL that are included in the application's metadata received from the outside server.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of executing in an image forming apparatus an application installed in an outside server, the method comprising:
   receiving, at the image forming apparatus, an input of an install uniform resource locator (URL);
   accessing, by the image forming apparatus, the outside server through the install URL and receiving from the outside server metadata of the application installed in the outside server, the metadata comprising at least one additional URL used to execute the application, the at least one additional URL being different from the install URL and having a form including the install URL;
   verifying a reliability of the received metadata by using a signature included in the metadata, a certificate of the outside server, and a public key stored in the image forming apparatus;
   creating an icon corresponding to the application on a user interface of the image forming apparatus when the reliability is verified;
   executing in the image forming apparatus the application installed in the outside server;
   receiving an application startup page from the outside server; and
   displaying the received application startup page on the user interface of the image forming apparatus,
   wherein the metadata further comprises a reverse URL through which the image forming apparatus transmits a request for an operation command to the outside server in order to avoid a firewall between the image forming apparatus and the outside server, and
   wherein the executing of the application comprises:
   transmitting, from the image forming apparatus, the request for the operation command to the outside server through the reverse URL;
   receiving, at the image forming apparatus, the operation command transmitted from the outside server as a response for the request for the operation command; and
   performing an operation according to the received operation command.

2. The method of claim 1, wherein the signature used to verify the reliability is included only in the metadata.

3. The method of claim 1, wherein, when executing the application, the metadata comprises:
   a home URL through which the image forming apparatus accesses the outside server, wherein the executing of the application comprises:
   selecting the created icon;
   accessing, by the image forming apparatus, the outside server through the home URL;
   receiving, at the image forming apparatus, an operation startup page of the application from the outside server; and
   showing the received operation startup page on the user interface of the image forming apparatus.

4. The method of claim 3, wherein the home URL is in a form including the install URL.

5. The method of claim 1, wherein the reverse URL is in a form including the install URL.

6. The method of claim 1, wherein the metadata further comprises an event URL through which the image forming apparatus transmits to the outside server an event that occurs in the image forming apparatus,
   wherein the executing of the application comprises:
   recognizing the event that occurs in the image forming apparatus; and
   transmitting the recognized event to the outside server through the event URL.

7. The method of claim 6, wherein the event URL is in a form including the install URL.

8. The method of claim 1, wherein the creating of the icon comprises creating on the user interface the icon that is included in the metadata.

9. A non-transitory computer-readable recording medium to contain computer-readable codes as a program to execute the method of claim 1.

10. An image forming apparatus comprising:
a communication interface to communicate with an outside server where an application is installed;
a user interface to receive a user input;
a controller to enable the image forming apparatus to perform an image forming operation by executing the application installed in the outside server; and
a multifunction printer, which includes a printer, a scanner, and a fax, to execute the image forming operation under the control of the controller,
wherein, once the image forming apparatus accesses the outside server through an install uniform resource locator (URL) received at the user interface, the communication interface receives metadata of the application from the outside server, the controller verifies a reliability of the received metadata by using a signature included in the metadata, a certificate of the outside server, and a public key stored in the image forming apparatus, and after completing the reliability verification, and creates on the user interface an icon corresponding to the application, the metadata comprising at least one additional URL used to execute the application, the at least one additional URL being different from the install URL and having a form including the install URL,
wherein the communication interface receives an application startup page from the outside server in response to the user input for executing the application, and the controller displays the received application startup page on the user interface unit, and
wherein the metadata further comprises a reverse URL through which the image forming apparatus transmits a request for an operation command to the outside server in order to avoid a firewall between the image forming apparatus and the outside server, and
wherein the controller enables the image forming apparatus to transmit the request for the operation command to the outside server through the reverse URL, receives an the operation command transmitted from the outside server as a response for the request for the operation command, and controls the multifunction printer to execute an image forming operation according to the received operation command.

11. The image forming apparatus of claim 10, wherein the signature used to verify reliability of the metadata is included only in the metadata.

12. The image forming apparatus of claim 10, wherein, when executing the application, the metadata comprises a home URL through which the image forming apparatus accesses the outside server,
wherein the controller receives the icon selection input from the user interface, controls the image forming apparatus to access the outside server through the home URL, receives an operation startup page of the application from the outside server, and controls the user interface unit to display the received operation startup page.

13. The image forming apparatus of claim 12, wherein the home URL is in a form including the install URL.

14. The image forming apparatus of claim 10, wherein the reverse URL is in a form including the install URL.

15. The image forming apparatus of claim 10, wherein the metadata further comprises:
an event URL through which the image forming apparatus transmits to the outside server an event that occurs in the image forming apparatus,
wherein the controller recognizes the event that occurs in the image forming apparatus, and transmits the recognized event to the outside server through the event URL.

16. The image forming apparatus of claim 15, wherein the event URL is in a form including the install URL.

17. A method of executing in an image forming apparatus an application installed in an outside server, the method comprising:
inputting into the image forming apparatus an install uniform resource locator (URL) corresponding to the outside server;
controlling the image forming apparatus to access the outside server via the install URL, and to receive from the outside server metadata of the application, the metadata comprising at least one additional URL used to execute the application, the at least one additional URL being different from the install URL and having a form including the install URL;
creating at the image forming apparatus a user interface corresponding to the application;
verifying a reliability of the received metadata by using a signature included in the metadata, a certificate of the outside server, and a public key stored in the image forming apparatus;
executing the application in the image forming apparatus via the user interface to perform an image forming function of the image forming apparatus when the reliability is verified;
receiving an application startup page from the outside server; and
displaying the received application startup page on the user interface of the image forming,
wherein the metadata further comprises a reverse URL through which the image forming apparatus transmits a request for an operation command to the outside server in order to avoid a firewall between the image forming apparatus and the outside server,
wherein the executing of the application comprises:
transmitting, from the image forming apparatus, the request for the operation command to the outside server through the reverse URL;
receiving, at the image forming apparatus, the operation command transmitted from the outside server as a response for the request for the operation command; and
performing an operation according to the received operation command.

18. The method of claim 17, further comprising:
controlling the image forming apparatus to request data from the outside server; and
receiving data from the outside server in response to the request.

19. The method of claim 17, wherein prior to controlling the image forming apparatus to access the outside server via the install URL, the metadata of the application is only stored in the outside server.

20. An image forming apparatus comprising:
a communication interface to communicate with an outside server;
a user interface to receive a user input; and
a controller to store an install URL, to access the outside server using the stored install URL to receive data from the outside server, to create an icon in a user interface according to a reliability of the received data, and to perform an image forming operation through the icon, the data comprising at least one additional URL used to execute the application, the at least one additional URL being different from the install URL and having a form including the install URL, wherein the reliability of the received data is verified by using a signature included in the received data, a certificate of the outside server, and a public key stored in the image forming apparatus, wherein the image forming apparatus receives an application startup page from the outside server in response to the user input for executing the application, and the controller displays the received application startup page on the user interface unit, and wherein the received data further comprises a reverse URL through which the image forming apparatus transmits a request for an operation command to the outside server in order to avoid a firewall between the image forming apparatus and the outside server, wherein the controller enables the image forming apparatus to transmit the request for the operation command to the outside server through the reverse URL, receives an the operation command transmitted from the outside server as a response for the request for the operation command, and controls the image forming apparatus to execute an image forming operation according to the received operation command.

21. The method of claim 1, wherein the at least one additional URL is used to bypass a firewall between the image forming apparatus and the outside server.

* * * * *